No. 656,326. Patented Aug. 21, 1900.
A. S. NEWBY.
OIL GAS LAMP.
(Application filed Apr. 12, 1899.)

(No Model.) 2 Sheets—Sheet 1.

WITNESSES:

INVENTOR
Albert S. Newby.
BY
ATTORNEYS.

THE NORRIS PETERS CO., PHOTO-LITHO., WASHINGTON, D. C.

No. 656,326. Patented Aug. 21, 1900.
A. S. NEWBY.
OIL GAS LAMP.
(Application filed Apr. 12, 1899.)
(No Model.) 2 Sheets—Sheet 2.

WITNESSES:
INVENTOR
Albert S. Newby.
BY
ATTORNEYS

THE NORRIS PETERS CO., PHOTO-LITHO., WASHINGTON, D. C.

UNITED STATES PATENT OFFICE.

ALBERT S. NEWBY, OF KANSAS CITY, MISSOURI, ASSIGNOR TO HIMSELF, AND BARRON G. COLLIER, OF MEMPHIS, TENNESSEE.

OIL-GAS LAMP.

SPECIFICATION forming part of Letters Patent No. 656,326, dated August 21, 1900.

Application filed April 12, 1899. Serial No. 712,745. (No model.)

*To all whom it may concern:*

Be it known that I, ALBERT S. NEWBY, of Kansas City, in the county of Jackson and State of Missouri, have invented a new and Improved Oil-Gas Lamp, of which the following is a full, clear, and exact description.

My invention relates to an improvement in oil-gas lamps of that kind in which the burner is heated by the flame of the lamp.

My invention consists of novel features to be hereinafter described and claimed.

Reference is to be had to the accompanying drawings, forming a part of this specification, in which similar characters of reference indicate corresponding parts in all the figures.

Figure 1:
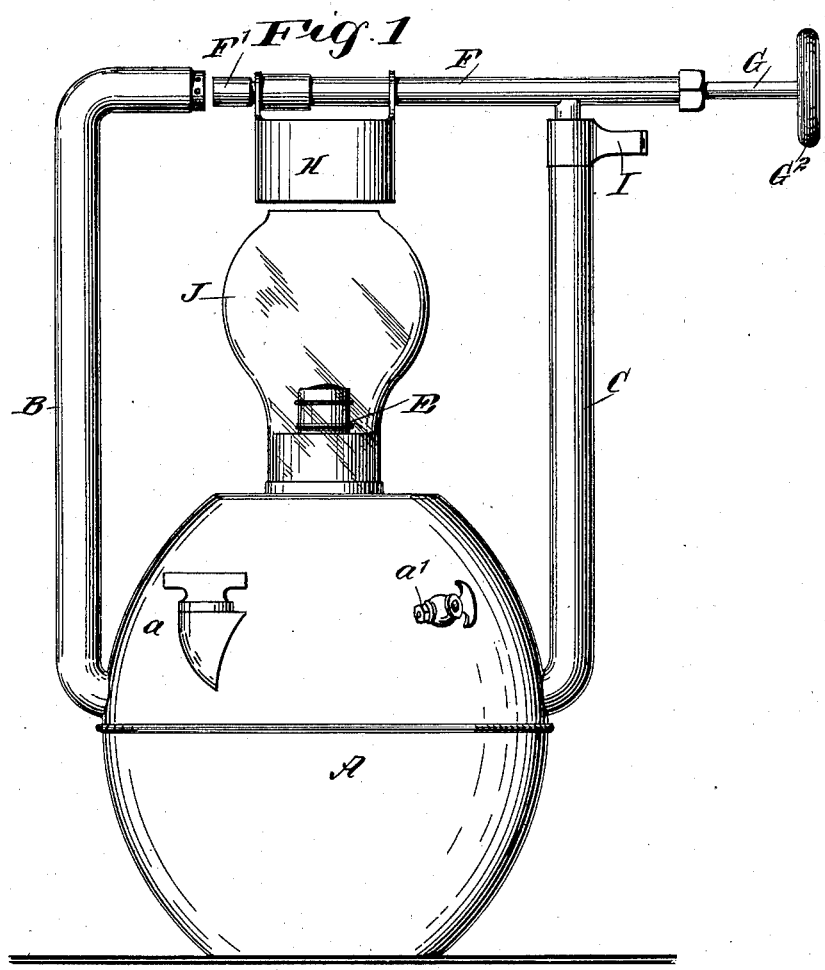
Figure 2:
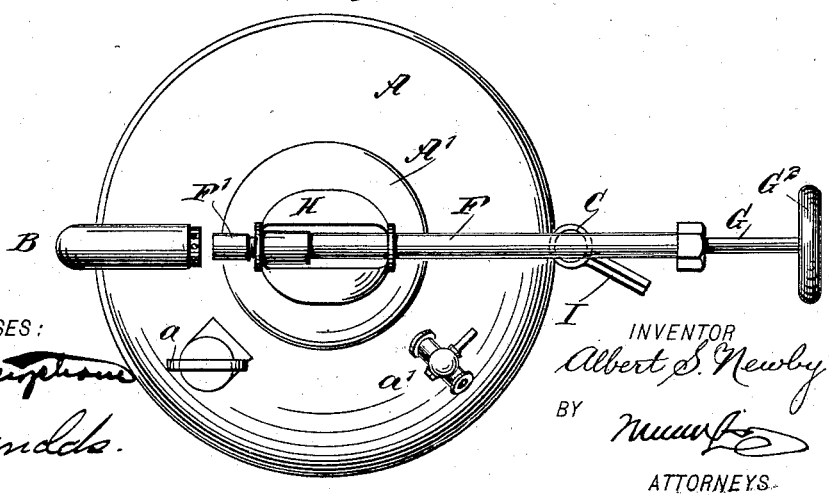
Figure 3:
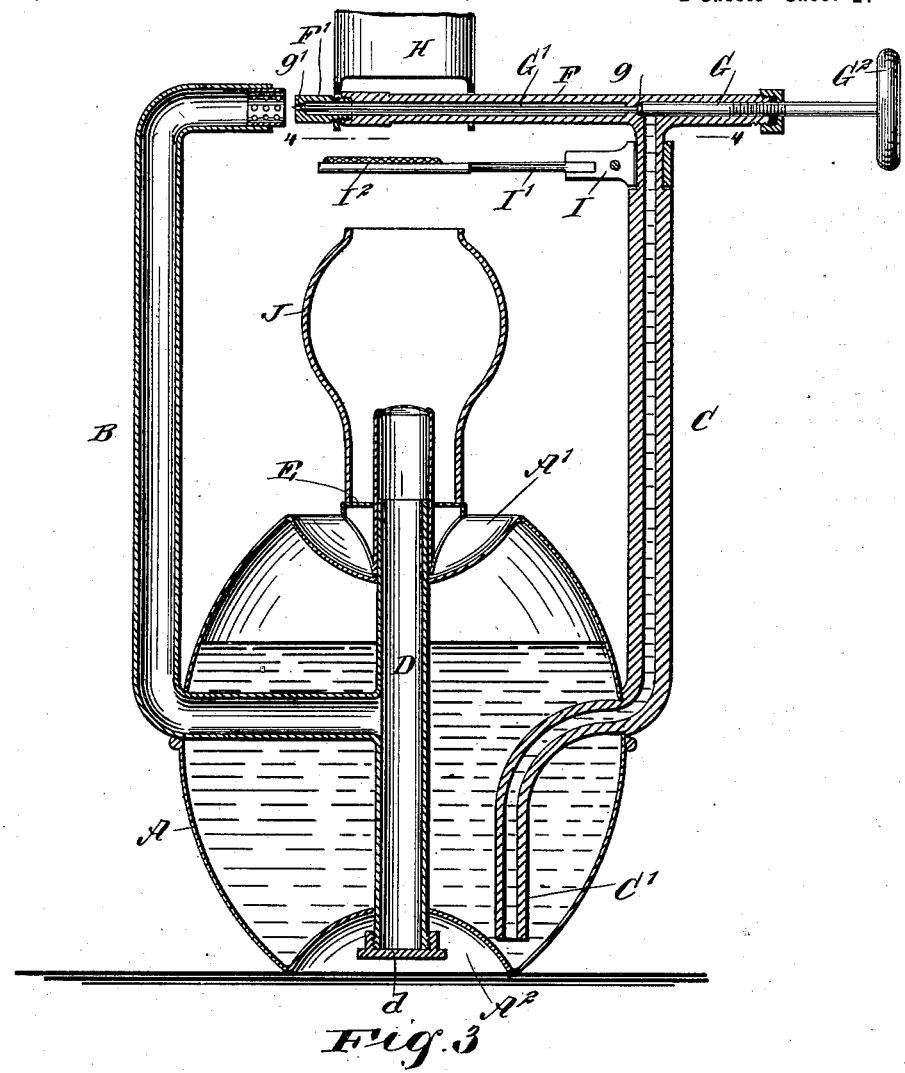
Figure 4:
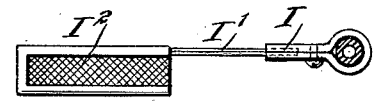
Figure 5:

Figure 1 is a side elevation of my lamp. Fig. 2 is a plan view. Fig. 3 is a sectional elevation. Fig. 4 is a plan view, on the line 4 4 in Fig. 3, of the torch by which the generator is heated in putting the lamp in use; and Fig. 5 is a transverse sectional view of said torch.

My lamp, as herein shown, belongs to that class of lamps in which the bowl or oil-reservoir is placed beneath the burner, the burner being supported thereby, and the generator placed above the burner, the oil being forced to the generator by air-pressure within the bowl. The bowl A is of any suitable form, but is herein shown as resembling a spheroid having concavities $A'$ and $A^2$ located in the top and bottom thereof. Passing vertically through the center of this bowl and terminating in said concavities is a tube D, which projects at its upper end through the wall of the bowl and is adapted to receive a burner E of any suitable construction thereon. The lower end of this tube projects through the lower side of the bowl into the concavity $A^2$ and is provided with a removable cap $d$, herein shown as threaded upon the tube, by which access may be had to the tube for cleaning it out whenever desired and by which the tube may be drained of any oil formed by condensation of the vapors. The tube D being straight is easy of access and is easily cleaned.

The mixing-tube B passes through the side wall of the bowl A at any convenient point, but preferably near the center of its height, as shown in the drawings, and is connected with the tube D near the middle of its length. The mixing-tube extends upwardly alongside of the lamp and has a horizontal section at its upper end opening in front of the generator, whereby it receives the gas as discharged from the generator and the air which is mixed with the gas. The oil-supply pipe C is connected with the opposite side of the bowl A and has its inner end $C'$ turned downwardly and terminating at the lowest part of the bowl. The oil-supply pipe extends upwardly in a manner somewhat similar to that of the mixing-tube and at its upper end is connected with a horizontal tube F, which constitutes the generator. This tube projects over the lamp and has its outer portion heated by the gases after leaving the lamp-chimney, whereby the oil within the generator is vaporized. A tip $F'$ is secured to the outer end of this tube and has a conical hole $g'$, by which the flow of gas is controlled. At some distance back from the end of the tube F is a projection having a conical valve-seat $g$ thereon adapted to be engaged by a shoulder upon the valve rod or needle G. This rod is of two sizes, the larger portion G extending through a suitable stuffing-box at the end of the tube F and being provided with a hand-wheel $G^2$, by which it may be readily turned. This section of the rod is provided with a threaded portion engaging with corresponding threads formed within the tube F, by which its adjustment may be closely regulated. The other portion of this rod is reduced in diameter, as shown at $G'$, and extends beyond the valve-seat $g$ and has its end pointed, so as to engage the valve-seat $g'$. The oil-supply pipe C connects with the pipe F at or near the valve-seat $g$. Under the construction described the shoulder at $g$ forms a valve by which the admission of oil to the generator is prevented, and the point of the rod engages the valve-seat $g'$ to prevent the escape of gas. It has been found that by using the shoulder at $g$ in addition to the pointed end of the rod the jamming of the pointed end of the rod into its seat is prevented, as the excess strain over that necessary to close the valve is taken by the shoulder, which is of large area and better adapted to receive the strain.

A hood or shield H is provided, which is in the form of a short section of pipe flattened somewhat at its upper end and swung by two ears from the generator F. This hood or shield is of such length that when it is suspended beneath the generator it will swing just clear of the upper end of the chimney J and immediately over the same, whereby the hot gases rising from the chimney are prevented from being blown away by winds and their contact with the generator assured. Without some such hood or shield it sometimes occurs in high winds that the hot gases are blown to one side, so that they do not engage the generator sufficiently to keep it heated to an operative temperature, in consequence of which the oil will not be vaporized and the lamp will go out.

In order to start lamps of this character, it is necessary to heat the generator by some means other than that of the lamp-burner. For this purpose a torch of some form is provided. I have herein shown a device by which a torch may be conveniently held while heating the generator. This consists of a socket-piece or ear I, which is pivoted upon the upper end of the oil-supply pipe C, but may, however, be pivoted upon any convenient member of the lamp. This ear, as herein shown, is formed of a strip of iron bent about the tube C and having its ends secured together by a rivet. The surfaces which are thus brought in contact are provided with grooves adapted to receive the end of a wire I', by which the torch is supported. The torch proper, I², consists of a body of asbestos or some refractory material which is absorbent and which is retained in shape by a covering of wire or sheet metal and is secured to the outer end of the wire I', so that when placed within the holder I the torch will lie immediately beneath the generator. The torch is dipped in a bottle of gasolene, alcohol, or other volatile fluid until it is soaked and is then inserted in the holder I and lighted. It will burn long enough to heat the generator sufficiently to volatilize the oil, at which time the burner E is lighted, which afterward furnishes the heat to maintain the generator at an operative temperature.

The bowl A is provided with a filling-opening at $a$, which is closed by a screw-cap or other suitable means by which a tight joint may be obtained, and is also provided with a nipple $a'$, adapted to receive the tube of an air-pump and provided with a valve by which it may be closed.

Having thus described my invention, I claim as new and desire to secure by Letters Patent—

1. An oil-gas lamp, comprising a bowl having a tube extending entirely through the same, and adapted to receive a burner at one end and a cap at the other, a mixing-tube having one end connected with the first-named tube and its other end extending above and partially over the bowl, a generator in front of the upper end of the mixing-tube, and means for delivering oil from the bowl to the generator, substantially as described.

2. An oil-gas lamp, comprising a bowl having a concavity in its top and another in its bottom, a tube extending through the bowl and terminating in said lower concavity, the upper end of said tube being adapted to receive a burner and the lower end to receive a cap, and a mixing-tube having its inner end connected with said first-named tube, within the bowl, substantially as described.

3. An oil-gas lamp, comprising a bowl adapted to receive and retain an internal pressure, an oil-supply pipe and a mixing-tube entering opposite sides of the bowl, the oil-supply pipe extending to the bottom of the bowl, and the mixing-tube having within the bowl, a vertical portion projecting through the top and bottom of the bowl, the lower end of said vertical portion being provided with a cap and the upper adapted to receive a burner, and a generator connected with the oil-supply pipe and extending over the burner, the mixing-tube opening in front of the generator-discharge, substantially as described.

4. An oil-gas lamp, comprising a bowl adapted to receive an internal pressure, an oil-supply pipe leading from the lower part of the bowl out through the same and extending upwardly, a generator connected with the upper end of the supply-pipe and projecting over the bowl, a central tube within the bowl and having its upper and lower ends projecting through the top and bottom of the same, the lower end of said tube being closed and the upper end adapted to receive a burner, and a mixing-tube leading into the bowl and having its inner end connected with said central tube, the outer end of the mixing-tube extending upwardly and having a horizontal section opening in front of the generator, substantially as described.

5. An oil-gas lamp comprising a bowl having concavities in its top and bottom, a vertical tube passing through the bowl, the lower end of the tube being provided with a cap and its upper end adapted to receive a burner, an oil-supply pipe leading from the lower part of the bowl out through the same and extending upwardly, a generator secured to the upper end of the supply-pipe and extending horizontally over the burner, and a mixing-tube leading into the bowl and connected with the vertical tube at about the center of its length, the outer end of the mixing-tube projecting upwardly and having a horizontal section opening in front of the generator, substantially as described.

6. In an oil-gas lamp, the combination with a burner, and a generator arranged above the same, of a torch mounted to swing beneath the generator, said torch comprising a socket-piece pivoted to swing horizontally, and a holder having a shank adapted to be inserted or removed from the socket-piece, substantially as described.

7. In an oil-gas lamp, the combination with a burner, and a generator arranged above the same, of a hood mounted to swing upon the generator and of a length to extend from the generator to within a short distance of the chimney of the burner, substantially as described.

ALBERT S. NEWBY.

Witnesses:
R. N. ALLEN,
ERNEST G. FRANKS.